(12) United States Patent  
Carcagno et al.

(10) Patent No.: US 6,905,150 B2  
(45) Date of Patent: Jun. 14, 2005

(54) THREADED PIPE JOINT

(75) Inventors: Gabriel E. Carcagno, Campana (AR); Giuseppe Della Pina, Treviolo (IT); Rita G. Toscano, Buenos Aires (AR); Antonio Podrini, Rome (IT)

(73) Assignee: Tenaris Connections AG, Schaan (LI)

( * ) Notice: Subject to any disclaimer, the term of this patent is extended or adjusted under 35 U.S.C. 154(b) by 34 days.

(21) Appl. No.: 10/439,238

(22) Filed: May 16, 2003

(65) Prior Publication Data

US 2004/0017080 A1 Jan. 29, 2004

(30) Foreign Application Priority Data

May 16, 2002 (IT) .................................. RM2002A0274

(51) Int. Cl.$^7$ ................................................ F16L 25/00
(52) U.S. Cl. ........................................ 285/334; 285/390
(58) Field of Search ............................. 288/333, 355, 288/390, 334

(56) References Cited

U.S. PATENT DOCUMENTS

| 4,623,173 A | 11/1986 | Handa et al. |
| 4,830,411 A | 5/1989 | Tsuru et al. |
| 5,064,224 A | 11/1991 | Tai |
| 5,066,052 A | 11/1991 | Read |
| 5,137,310 A | 8/1992 | Noel et al. |
| 5,649,725 A | 7/1997 | Nagasaku et al. |
| 6,305,723 B1 | 10/2001 | Schutz et al. |
| 6,409,175 B1 | 6/2002 | Evans et al. |
| 6,557,906 B1 | 5/2003 | Carcagno |
| 2002/0017788 A1 | 2/2002 | Krug et al. |
| 2002/0163192 A1 | 11/2002 | Coulon et al. |
| 2003/0067166 A1 | 4/2003 | Sivley, IV |
| 2003/0107217 A1 | 6/2003 | Daigle et al. |

FOREIGN PATENT DOCUMENTS

| CA | 2128060 | 1/1996 | |
| EP | 0713952 | 5/1996 | ......... E21B/17/042 |
| EP | 0916883 | 5/1999 | ........... F16L/15/04 |
| EP | 1020674 | 7/2000 | ........... F16L/15/04 |
| EP | 1203909 | 5/2002 | ........... F16L/15/06 |
| WO | 01/94831 | 12/2001 | ........... F16L/15/06 |

*Primary Examiner*—Aaron Dunwoody  
(74) *Attorney, Agent, or Firm*—Fitzpatrick, Cella, Harper & Scinto

(57) ABSTRACT

Threaded pipe joint comprising a male element (1) and a female element (2), threaded and provided with respective complementary sealing surfaces, which define, when screwed together, a notch (13) formed on the female element (2) of a predetermined length (X), and a space (7, 8) between the threads of predetermined section (S), forming reservoir to house the joint lubricant, which comes out of the volume between the threads of the female (2) and male (1) elements during the tightening of the joint.

9 Claims, 2 Drawing Sheets

THREADED PIPE JOINT

FIELD OF INVENTION

The present invention relates to a joint for drilling pipes and more precisely, a threaded joint for joining pipes used in the search and exploitation of hydrocarbons, in particular pipes for casing of wells, either for oil and/or gas, exploration and/or pumping. The joints are of the male/female type, in which a particular design of the thread and the sealing surfaces together with a reservoir to collect the lubricant in excess ensures avoidance of pressure peaks caused by the lubricant during tightening and an excellent sealing capacity even under high axial tensile loads. Such pipes can be used both for casings for drilling wells and as strings for gas or oil pumping.

STATE OF THE ART

In the natural gas and oil extraction industry, in the preliminary drilling phase, drilling is carried out either on the sea bed or on land, until the petroleum or gas reservoir is reached, which may even lay at depths of thousands of metres. During such preliminary phase, in order to protect and guide the drilling rod, the well is cased with pipes of a pre-established length, which are connected to each other at the ends by means of threaded joints as the drilling depth increases.

Once drilling has been completed, another tubular string is introduced inside the thus cased well, which is used to pump gas or crude oil towards the surface from the underground reservoir. This string, which lies along the whole depth of the well and which can therefore reach several thousand metres in length, is also formed by joining, by means of joints of the same type as above, pipes about ten metres long.

The pipes, made of carbon steel or of corrosion-resistant alloys, in case the conditions of the well should be particularly aggressive due to the presence of corrosive elements, must resist to high stress at the bottom of the well, such as the pressure of the fluid that is pumped, temperatures of the well, in particular at great depths, and the relative variations in the size of pipes, mechanical stresses generated by the weight of the string etc, always ensuring both gas and oil seal. It is extremely important, therefore, that a joint also offers the same performance as the pipe body, maintaining an airtight seal for fluids, and also ensuring the continuity of the walls of the well even in difficult conditions, due to the environment, depth and arrangement of the well, which can be diverted or horizontal.

To make safer and more reliable the screwing operations of the joints and the seal and integrity of the latter, new designs of threaded joints are continuously developed and the behaviour and effects of the lubrication means, which are used either to avoid seizures (grease or dope, or casings to aid screwing) or to contribute to the seal, are tested.

Such lubricants are interposed in the empty space between the female and male threads of the joint, and in the metal/metal seal areas, in order to ensure that no non-lubricated areas are present. However, if no appropriate measures are taken, the use of lubricants can be extremely dangerous for the integrity of the joint. In fact, as make-up proceeds, in particular when the sealing surfaces come into contact with each other and tightening of the joint begins, lubricant remains trapped in the space between the teeth of the thread and in the area between seal and thread, and is therefore compressed strongly. However, as the lubricant is incompressible, extremely high pressure peaks occur that are extremely harmful, that can cause a deformation of the joint, in particular of the metal/metal sealing surfaces.

In order to solve this problem, the U.S. Pat. No. 4,830,411 proposes to increase the space between the threads to house the lubricant; however, it has been noted that when tightening the joint, very high pressure peaks are still reached, even if, in time, the lubricant can flow and the pressure therefore decreases, and therefore the problems due to the pressure peaks remain unsolved.

U.S. Pat. No. 5,649,725 there is provided a reservoir to collect the lubricant leaking from the thread area during the tightening of the joint. This type of joint, however, has focused its attention on the definition of the length of the distance $L_s$ along which the sliding of the sealing surfaces occurs during the make-up of the pipes, to remove the phenomenon of galling, determining it as a particular function of the pipe's external diameter. The document, on the other hand, has not solved the problem caused by the high-pressure peaks that develop upon tightening, in particular due to the non-optimal design of the reservoir, for which only the interval in which the length can vary depending on the thread rate is suggested. In this case, however, the problem of the development of high-pressure peaks during make-up of the joints has not been overcome in a satisfactory manner.

Other solutions, for example in patent U.S. Pat. No. 5,137,310, provide for the reduction to a minimum of the time interval between the moment when the sealing surfaces come into contact and the moment of the final tightening of the joint, by means of a high taper of the sealing surfaces with respect to the axis of the joint, thus reducing to a minimum the volume of lubricant that remains trapped. These solutions, though having proved to be efficient from the-point of view of the reduction of the peaks of pressure in the lubricant, are found to be weak from the point of view of the seal under high axial tensile loads because of the high taper of the sealing surfaces.

Therefore, up to now, the problem of having a lubricated joint easy to assemble, which can be completely tightened without negative collateral effects and which ensures a seal even under strong axial tensile loads of has not been solved favourably.

SUMMARY OF THE INVENTION

The object of the present invention is to provide a joint that presents, after tightening, reduced pressures in the lubricant of the joint and has excellent performance levels.

Another object of the invention is to provide a joint maintaining excellent performance even with excessive use of lubricant, which can result from an incorrect application by users when being applied in operation.

Another object of the present invention is to provide a joint easy to assemble and to tighten in operational conditions during installation and that can therefore be used with automatic plants.

Another object of the present invention is to provide a joint that can be manufactured and used both with carbon steels and with corrosion-resistant alloys, such as stainless steels with a high content of chrome or Chrome/Nickel alloys, in which the presence of chromium favours the seizure of the sealing surfaces and therefore requires particular precautions in planning and execution.

These and other objects that will become apparent from the present description are achieved according to the present invention by means of a threaded joint for pipes, which in compliance with the disclosed invention comprises a generally tubular male element with a nominal external diameter carrying a respective male threading near to one of its ends, comprising teeth having each lead-in and load flanks, with roots there between and, between said end and said respective thread, a first unthreaded surface carrying a first sealing surface, and an abutment surface near its extremity, a generally tubular female element carrying a respective female threading close to one of its ends, comprising teeth, having each lead-in and load flanks, with roots there between and, between said end and said respective thread, a second sealing surface, complementary to said first sealing surface of the male element, said male and female threads defining between them, when made-up together, a space to store lubricant, said male and female elements defining a common symmetrical axis of the joint, said female element being further provided with a notch between said respective female thread and said second sealing surface, of a substantially toroidal shape, constituting a reservoir for the lubricant flowing out of the space between the threads of the female and male elements during tightening of the joint, and with an abutment surface adapted for cooperating with the abutment surface of the male element when the male and female elements are completely made-up, wherein said notch has a length, measured parallel to the joint axis, between 4 and 10 mm, that it begins at a distance from the abutment surface of the female element, between 5 and 12 mm, and has a volume, expressed in mm³, in absolute value of at least 25 times the numerical value of the nominal external diameter, expressed in mm, of said male element.

In a particular embodiment of the invention, together with the abovementioned reservoir, the joint is characterised by the presence in the thread of a space between the peak of the tooth of the male thread and the root of the female element and also between the lead-in flanks of the corresponding teeth, which defines an empty zone whose area, in the plane of a longitudinal axial section of the joint, is greater than 0.4 mm².

Moreover, the choice of the particularly low value, and substantially lower than the length of the notch, of the distance in the axial direction between the point of first contact between the respective sealing surfaces of the ends of the male element and the female element, during make-up of the joint, and the final position of screwing of the sealing surfaces, allows for the formation of the seal to be delayed with the result that the closure of the notch that functions as a reservoir for the dope or grease for the joint is delayed and the amount of dope that remains trapped is reduced.

Finally, the design of the joint, especially regarding the mutual positions of the threads and the notch, is such that when the joint is completely tightened, the tooth of the male thread nearest to the reservoir does not totally occupy the space of the reservoir itself.

From the combination of the elements that make up the joint according to the invention and the innovative geometric characteristics of these elements there results a joint with optimised performance as searched for in the preamble.

In this way, both a reduction of the pressure of the grease in the joint and a better behaviour in forming the seal between the two elements of the joint are achieved, yet maintaining the high structural performance level that allows it to be used even in the presence of high stress, particularly in an axial direction, thus making the use of it advantageous for particular applications.

Further particular embodiments of the invention are described in the dependent claims.

BRIEF DESCRIPTION OF DRAWINGS

The present invention will now be described with reference to a preferred embodiment, illustrated by way of a non-limiting example of the objects and the scope of the present invention in the appended drawings, in which.

DETAILED DESCRIPTION OF A PREFERRED EMBODIMENT

With reference to the figures, a joint according to the present invention is now described as a non-limiting example.

The joint according to the present invention, used to join pipes with a nominal diameter D, comprises a male element carrying an external thread 1', and a female element 2 bearing an internal thread 2'. The common axis of the pipe and the male and female elements is indicated with A.

Figure 1:
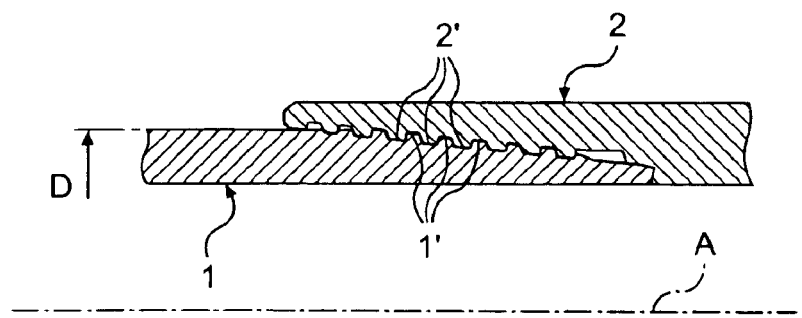
FIG. 1 is a section view of a joint according to the invention after make-up.
Figure 2:
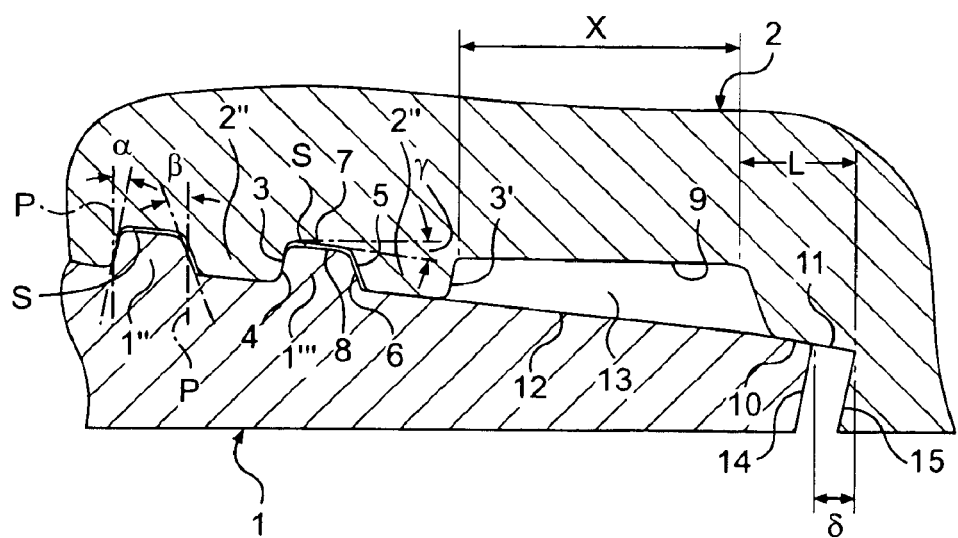
FIG. 2 is an enlarged view of part of FIG. 1 and shows, in particular, the end part of the thread, the reservoir for the dope and the sealing surfaces.
Figure 3:
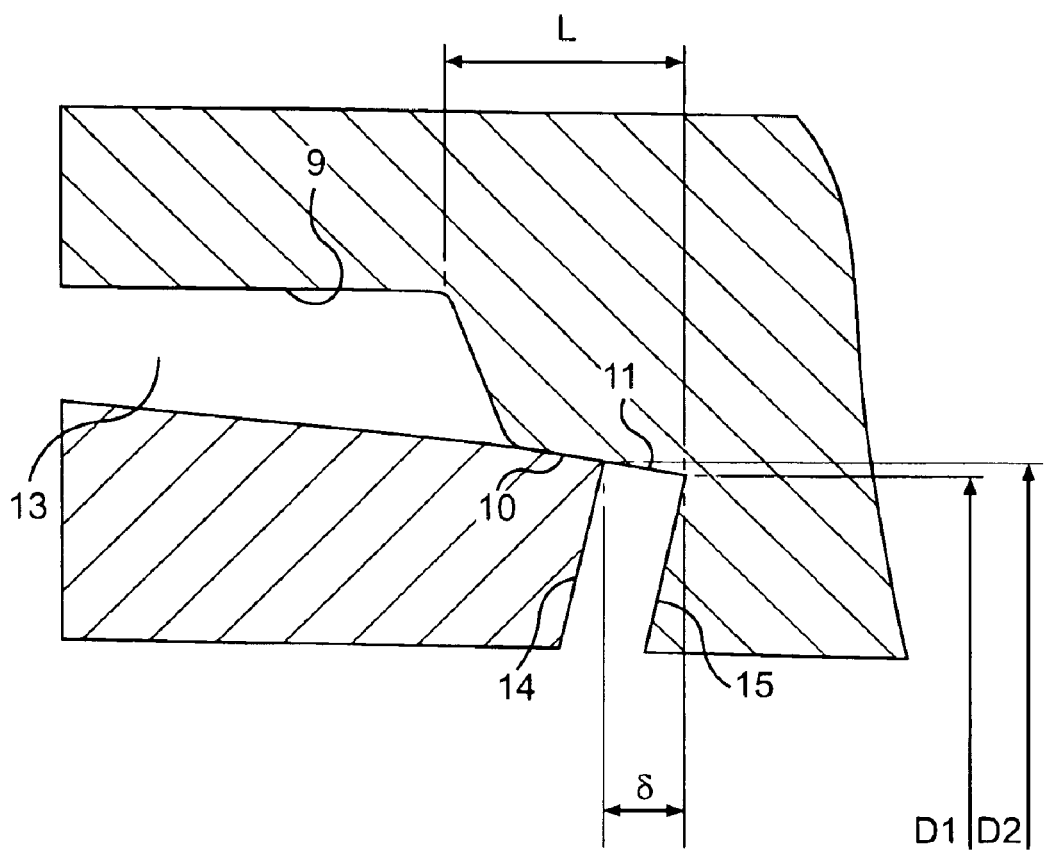
FIG. 3 is an enlarged view of part of FIG. 2.

All the teeth 1",1'" and 2" of the threads 1' and 2' respectively have lead-in flanks, respectively 6 and 5, inclined towards the left, in the sense of FIG. 2, with respect to a perpendicular P to the axis A of an angle β between 10° and 25°, and load flanks, 4 and 3 respectively, inclined, in the sense of FIG. 2, with respect to a perpendicular P to the axis A of an angle α between −4° and 3°. The peaks 8 and the roots 7 of the teeth are inclined with regard to the axis A of the pipe of an angle γ of a value between 0° and 4°.

The inner part of the male element 1 comprises a tapered non-threaded surface 12, and ending with a portion 10. The most inner part of the joint of the female element 2 has a notch 13, and an end surface 11 which, when the joint has been totally tightened, is in contact with the surface 10. The internal end of the male element 1 has a truncated cone-shaped abutment surface 14 parallel to a corresponding truncated cone surface 15 of the female element 2 and intended to come into contact with each other when the two elements 1 and 2 are completely made-up.

During the screwing of the joint, the flanks 6, 5 and 8, 7 of the thread teeth are at a distance from each other so as to define a space between them intended to hold the dope of area S, defined on the longitudinal axial section plane of the joint and included between the male thread peaks 8, the female thread roots 7 and the surfaces of the lead-in flanks 5 and 6. This area S is greater than 0.4 mm² and is preferably between 0.4 and 0.6 mm².

While screwing the joint, the dope placed on the threads flows into the space between the threads of area A towards the notch or the reservoir 13, that begins at a pre-established distance L, of a value comprised between 5 and 12 mm from the abutment surface 15 of the female element. Said notch 13 has a length X, measured parallel to the joint axis, between 4 and 10 mm, preferably between 4 and 8 mm, and even more preferably between 5 and 8 mm. The volume of the reservoir 13 in mm³ is equal, in absolute value, to at least 25 times the numerical value of the nominal external diameter D, expressed in mm, of the pipe 1, and is preferably 30 times higher than D.

In the joint it is advantageously provided that the profile of the sealing surfaces 10 and 11 is such that, during screwing, the distance δ, measured in an axial direction between the point of first contact between the two sealing surfaces 10 and 11 and the final position of the screwing of the two elements 1 and 2 is less than the length X, preferably less than 0.6X, even more preferably less than 0.5X. After the sealing surfaces 10 and 11, during the screwing, have established the first contact, the lubricant that is between the seal and the thread can no longer flow outside and is accumulated in the notch or reservoir 13. Minimising the distance δ permits a delay in closing the reservoir 13 and consequently a reduction of the quantity of trapped dope.

By permanently tightening the joint, the surfaces 10 and 11 mutually slide with interference, forming a metal-to-metal seal area, until the supporting surfaces 14 and 15 enter permanently into contact, signalling the completed tightening of the joint and forming a further contribution to the sealing of the joint.

In a particularly advantageous embodiment, when the joint has been completely made-up, the tooth 1''' of the male thread nearest to the sealing surface 10 does not occupy the space of the reservoir 13; in other words, the flank 6 will be, in the most advanced position of the male thread, at the most aligned with the flank 3', thus leaving the entire volume of the reservoir 13 available for the lubricant, and in such a way preventing the occurrence of harmful peaks of pressure.

Due to the size and volume adopted with the present invention, when the flow channel is closed, the amount of grease that remains on the joint is less than the volume destined to contain it. In such a way, the lubricant inside the joint is not compressed and therefore no peak of pressure is ever created. The optimal volume of the reservoir 13 offers this advantage without causing an unacceptable weakening of the joint.

We claim:

1. A threaded joint for pipes, comprising a generally tubular male element (1) with a nominal external diameter (D) carrying a respective male threading near to one of its ends, comprising teeth (1'), having each lead-in (6) and load (4) flanks, with roots there between and, between said end and said respective thread, a first unthreaded surface (12) carrying a first sealing surface (10), and an abutment surface (14) near its extremity, a generally tubular female element (2) carrying a respective female threading close to one of its ends, comprising teeth (2'), having each lead-in (5) and load (3) flanks, with roots there between and, between said end and said respective thread, a second sealing surface (11), complementary to said first sealing surface (10) of the male element (1), said male and female threads defining between them, when made-up together, a space to store lubricant, said male (1) and female (2) elements defining a common symmetrical axis (A) of the joint, said female element (2) being further provided with a notch (13) between said respective female thread and said second sealing surface (11), of a substantially toroidal shape, constituting a reservoir for the lubricant flowing out of the space between the threads of the female (2) and male (1) elements during tightening of the joint, and with an abutment surface (15) adapted for cooperating with the abutment surface (14) of the male element, when the male (1) and female (2) elements are completely made-up, wherein said notch (13) has a length (X), measured parallel to the joint axis, between 4 and 10 mm, that it begins at a distance (L) from the abutment surface (15) of the female element (2), between 5 and 12 mm, and has a volume, expressed in mm$^3$, in absolute value of at least 30 times the numerical value of the nominal external diameter (D), expressed in mm, of said male element (1), wherein the flank (6) of the tooth of the thread of the male element (1) nearest to the first sealing surface (10) is at a distance greater than or equal to L+X from the abutment surface (14) of the male element whereby said flank (6) of the tooth of the thread of the male element (1) is at most circumferentially aligned with the flank (3') nearest to the end of said female element (2) of said notch when made up, thus leaving the whole volume of the reservoir (13) available for the lubricant.

2. The threaded joint according to claim 1, wherein said notch (13) has a length (X) between 4 and 8 mm.

3. The threaded joint according to claim 2, wherein said notch (13) has a length (X) between 5 and 8 mm.

4. The threaded joint according to claim 1, wherein the volume of the notch (13) is more than 30 times larger than the numerical value of the nominal external diameter (D) of the male element (1), expressed in mm.

5. The threaded joint according to claim 1, wherein between the peak (8) of a tooth of the thread of the male element (1) and the root (7) between the adjacent teeth of the thread of the female element (2) and between the lead-in flanks (6) and (5) of the same teeth a space is defined, whose area (S), in the plane of a longitudinal axial section of the joint, is greater than 0.4 mm$^2$, and wherein the profile of the sealing surfaces (10) and (11) is such that, during making up, the point in which the first contact between the two sealing surfaces takes place is axially distant from the final screwing position of the two male (1) and female (2) elements by a value δ less than the length (X) of said notch (13).

6. The threaded joint according to claim 5, wherein the area (S) of said space is between 0.4 and 0.6 mm$^2$.

7. Threaded joint according to claim 5, wherein the value of δ is 0.6 times lower than the length (X) of said notch (13).

8. The threaded joint according to claim 5, wherein the value of δ is 0.5 times lower than the length (X) of said notch (13).

9. The joint according to claim 1, wherein the teeth (1", 1''') and (2") of the threads of the male (1) and the female (2) elements respectively have lead-in flanks, respectively (6) and (5), inclined with regard to a perpendicular (P) to the axis (A) of an angle β with a value between 10 and 25°, and load flanks, respectively (4) and (3), inclined, with regard to a perpendicular (P) to the axis (A) of an angle α with a value between −4° and 3°.

* * * * *